United States Patent [19]

Tsujita

[11] Patent Number: 5,325,736
[45] Date of Patent: Jul. 5, 1994

[54] BEARING DEVICE FOR SUPPORTING A MOTOR SHAFT

[75] Inventor: Kazuaki Tsujita, Kosai, Japan
[73] Assignee: ASMO Co., Ltd., Shizouoka, Japan
[21] Appl. No.: 989,213
[22] Filed: Dec. 11, 1992
[30] Foreign Application Priority Data Feb. 27, 1992 [JP] Japan .................. 4-018398[U]

[51] Int. Cl.⁵ .............................................. F16H 55/22
[52] U.S. Cl. ............................... 74/425; 310/90; 384/192
[58] Field of Search .......... 74/89.14, 425; 310/90; 384/192

[56] References Cited

U.S. PATENT DOCUMENTS 3,848,477 11/1974 Giandinoto et al. .......... 74/425
4,420,703 12/1983 Adam et al. ............... 310/90 X

FOREIGN PATENT DOCUMENTS

| 107213 | 9/1927 | Australia ............ 384/192 |
| 60-103743 | 7/1985 | Japan . |
| 63-159078 | 10/1988 | Japan . |
| 2-104757 | 8/1990 | Japan . |
| 2-105632 | 8/1990 | Japan . |
| 3-48357 | 5/1991 | Japan . |
| 3-105719 | 11/1991 | Japan . |
| 4-28762 | 3/1992 | Japan . |
| 7506143 | 12/1975 | Netherlands ......... 384/192 |

*Primary Examiner*—Allan D. Herrmann
*Attorney, Agent, or Firm*—Stetina and Brunda

[57] ABSTRACT

A bearing device for use with of a motor, includes a worm-like thread, which is threaded to a rotor shaft, and which engages a worm wheel. The rotor shaft is supported by a pair of radial bearings. When the rotor shaft is not caused to bend, a third radial bearing is spaced away from the outer peripheral surface of the rotor shaft. When the rotor shaft is caused to bend under the counter force generated by the worm wheel, the rotor shaft is supported by the third radial bearing along the bend direction.

6 Claims, 5 Drawing Sheets

BEARING DEVICE FOR SUPPORTING A MOTOR SHAFT

BACKGROUND OF THE INVENTION

1. Field of the Invention

The present invention generally relates to bearing device for supporting a motor shaft. More particularly, the present invention pertains to a bearing device for use with a motor shaft having a worm gear on its rotor shaft.

2. Description of the Related Art

A conventional motor shaft includes a worm-like thread that meshes in a worm wheel, so that rotational motion can be transferred between shafts that are disposed perpendicularly to each other. The output rotational speed is significantly reduced, and is a function of the gear ratio of the thread with respect to the worm wheel. This configuration is used in many applications where speed reduction is required, such as in power window motors, motors for reclining seats and wiper motors.

As illustrated in FIG. 6, a rotor shaft 80 of the motor includes a distal end and a proximal end. The distal end is supported by a radial bearing 84 for preventing the rotor shaft 80, from shifting in the radial direction.

The rotational motion of the rotor shaft 80 is transferred to the worm wheel by the thread 86 of the worm gear. The counter force generated by the worm wheel affects the rotor shaft 80. The rotor shaft 80, whose ends are supported by the radial bearings 82 and 84, is caused to bend in the direction opposite to the worm wheel side, under the effect of the counter force. Therefore, the magnitude of the gear engagement between the thread 86 and the worm wheel becomes smaller. The rotational stress caused by the bend in the shaft 86, reduces its strength. The size of the rotor shaft 80 and the radius of the gear teeth would normally be increased in order to reduce its rotational stress. Consequently, the reduction in the size and weight of the motor is difficult to achieve.

The Japanese Unexamined Utility Model Publication No. 60-103743 discloses an improved bearing device for a motor shaft, which addresses the foregoing drawbacks. In this bearing device, the rotor shaft 80 is supported by three radial bearings. As illustrated in FIG. 7, a first and second radial bearings 82 and 84 are provided at the distal and proximal ends of the rotor shaft 80, respectively. A third radial bearing 90 is also disposed at the central section of the rotor shaft 80, between the thread 86 and a rotor 88. When the rotor shaft 80 is supported at three points, the magnitude of the bend of the rotor shaft 80 is compensated by the third radial bearing 90. Therefore, the size and weight reduction in the motor can be achieved.

However, when the rotor shaft 80 is supported by three points, the axial centers of the three radial bearings 82, 84 and 90 should be aligned. An offset in the alignment of the three radial bearings 82, 84 and 90 or a dimensional error generated in the various assembled parts of the motor, generates friction that will impede the smooth rotation of the rotor shaft 80, such that the rotational speed of the rotor shaft is undesirably affected. Generally, if the rotational speed fluctuates, the current induced in a coil also fluctuates. Therefore, the electric drive circuit is undesirably affected by this current fluctuation, and it becomes difficult to maintain the motor performance. Furthermore, the offset in the alignment of the three radial bearings 82, 84 and 90 generates undesirable vibration, such that the rotation of the rotor shaft 80 becomes unstable.

Even if the rotor shaft 80 were supported at three points, the flexible bent of the rotor shaft 80 is not completely eliminated. As illustrated in FIG. 8, the distal end of the rotor shaft 80 contacts the inner peripheral surfaces of the associated radial bearings and generates noise. Noise is also similarly generated even when the rotor shaft 80 is supported at two points.

If the rotor shaft were bent at the vicinity of the thread, the motor would not smoothly start, since the radial bearing 82 does not support the rotor shaft 80 evenly.

SUMMARY OF THE INVENTION

Accordingly, it is a primary objective of the present invention to provide a bearing device for a motor shaft, that prevents noise generation and provides a comfortable work environment.

It is another object of the present invention to provide a bearing device for a motor shaft, that provides a smooth rotation of the rotor shaft and facilitates the maintenance of the motor.

It is yet another object of the present invention to provide a bearing device for a motor shaft that allows the motor to start smoothly.

To achieve the foregoing and other objects, and in accordance with the purpose of the present invention, there is disclosed a bearing device for use with of a motor, which includes a worm-like thread. The thread is threaded to a rotor shaft, and engages a worm wheel. The rotor shaft is supported by a pair of radial bearings. When the rotor shaft is not caused to bend, a third radial bearing is spaced away from the outer peripheral surface of the rotor shaft. The first and second bearings include peripheral tapered surfaces, and each of these tapered surfaces has an outwardly radially increasing diameter for avoiding interference with the corresponding end of the rotor shaft.

According to the present invention, when the rotor shaft is bent by the counter force generated by the worm wheel, the rotor shaft is supported by the third radial bearing in the direction of the bend. However, when the rotor shaft is not bent, the rotor shaft is supported at two points. As a result, the intermediate section of the rotor shaft does not make undesirable contact with the third radial bearing. Therefore, vibration is prevented and smooth and quiet rotation of the rotor shaft can be achieved.

Even when the rotor shaft is bent by the counter force generated by the worm wheel, the distal end sections of the rotor shaft do not abut against the inner peripheral surface of both radial bearings since a part of the inner peripheral surfaces of both radial bearings are outwardly tapered. Therefore, noise generation caused by the distal ends of the rotor shaft abutting against the inner peripheral surface is significantly reduced. Furthermore, the distal ends are not kept in the abutting condition, so that the ability for starting the motor can be improved.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiment together with the accompanying drawings in which:

DETAILED DESCRIPTION OF THE PREFERRED EMBODIMENT

Figure 1:
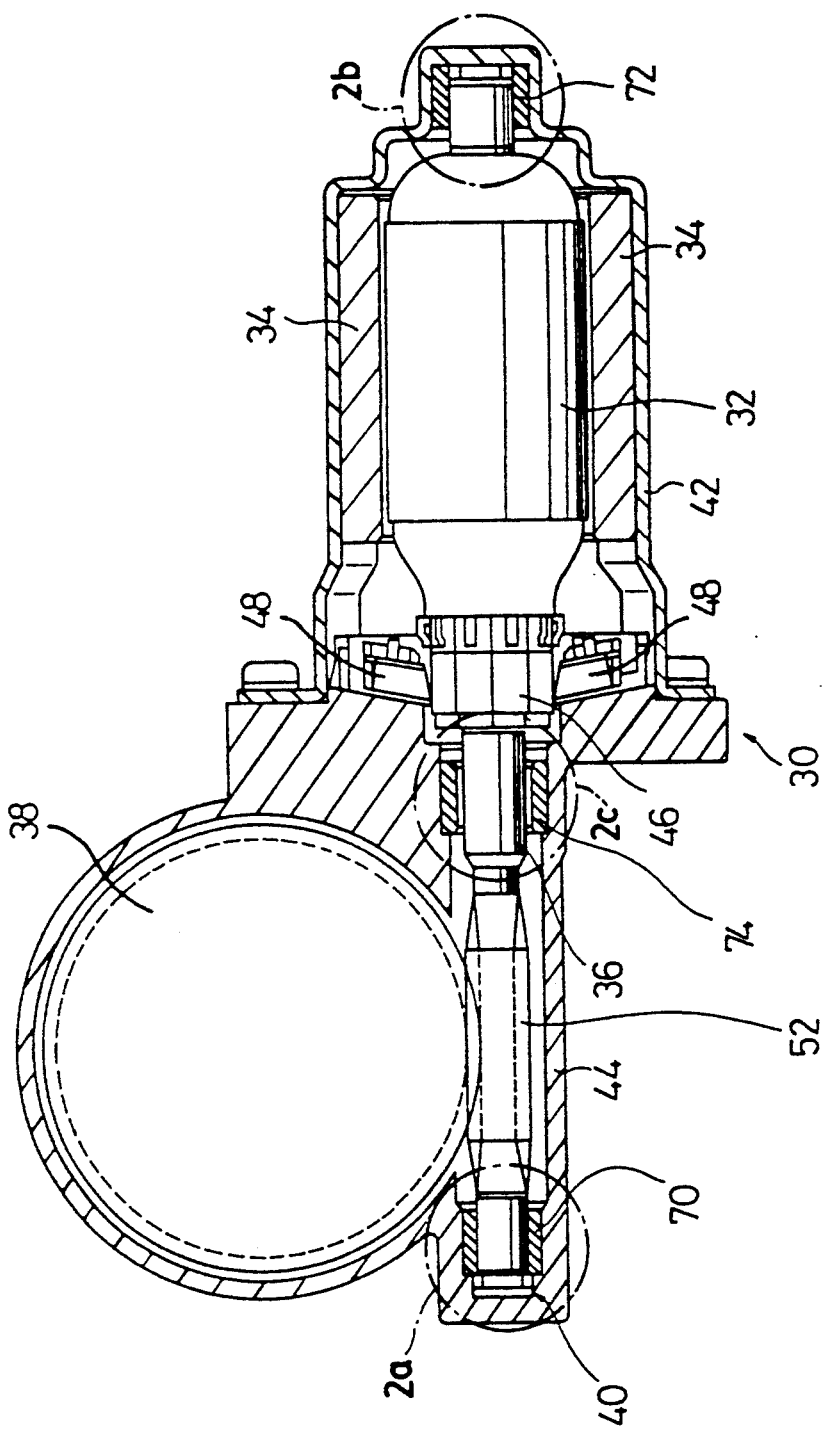
FIG. 1 is a cross-sectional view illustrating a bearing device for a motor shaft according to one embodiment of the present invention.

A preferred embodiment of the present invention will now be described referring to FIGS. 1 through 5. As illustrated in FIG. 1, a bearing device for a motor shaft is used in a motor for a reclining seat.

As illustrated in FIG. 1., a casing 30 of the motor houses a rotor 32, a plurality of magnets 34, a rotor shaft 36, a worm wheel 38 and a thrust bearing 40. The casing 30 is formed by integrally securing a metal housing 42 to a synthetic resin housing 44. The metal housing 42 is made of a iron plate, and the synthetic resin housing 44 is selected from a family of synthetic resin material, such as PET (polyethylene terephthalate).

A rotor 32 is rotatably disposed within the housing 42. The magnets 34 are embedded in the inner peripheral wall of the housing 42 around the rotor 32, and are equidistally separated. Consequentially, a magnetic field is induced. A commutator 46 is integrally rotatably disposed at the interconnection section between the housings 42 and 44, with respect to the rotor 32. A plurality of brushes 48 are provided at the peripheral surface of the commutator 46, in such a way that the brushes 48 surround the commutator 46.

The rotor 36 and the commutator 46 form the rotor shaft 36, which protrudes from the metal housing 42 and the housing 44. The rotor 36 is operatively supported by radial bearings 70 and 72, which are disposed at the distal end sections of the housing 42 and the housing 44, respectively.

A radial bearing 74 is berried at an intermediate section within the housing 44. The inner diameter of the radial bearing is set slightly larger than the outer diameter of the rotor shaft 36. The rotor shaft 36 does not make contact with the radial bearing when the motor is not activated. Radial bearing are generally divided into two types, a rolling bearing and a sliding bearing. In the embodiment of the present invention, the sliding bearing is employed. Therefore, the rotor shaft 36 is supported by the radial sliding-type bearings 70 and 72. The movement in the radial direction of the rotor shaft 36 is then limited.

A worm gear includes a worm-like thread 52 and a worm wheel 38. The thread 52 is formed on the rotor shaft 36, and the worm wheel 38 is formed within the housing 44. The rotational motion of the rotor shaft 36 is transferred to another shaft which is disposed perpendicular to the rotor shaft. When the rotor shaft 36 starts to rotate, a counter force is generated due to the gear engagement of the thread 52 and the worm wheel 38. The counter force acts as a load in the direction from the worm wheel 38 to the thread 52.

A load in the direction of the thrust is applied on the rotor shaft 38, via the thread 52, which meshes with the worm wheel 38. In this embodiment, a thrust bearing (not shown) which supports the proximal end of the rotor shaft 36 is supported against the metal housing 42, in order to sustain this load. The distal end of the rotor shaft 36 is supported by the thrust bearing 40. Therefore, the load applied in the axial direction is sustained by the thrust bearing 40.

Figure 2A:
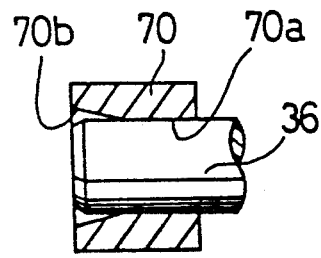
FIG. 2a is an enlarged view illustrating a radial bearing which is enclosed by circle 2a in FIG. 1.

FIG. 2a illustrates the area enclosed in the circle A in FIG. 1, where the radial bearing 70 is disposed on the rotor shaft 36 at the thread side. The outer peripheral surface of the distal end of the rotor shaft 36 is supported by a bearing surface 70a of the radial bearing in the radial direction. The radial bearing 70 includes a tapered surface 70b, which is formed at the distal end, and the inner surface is outwardly tapered.

Figure 2B:
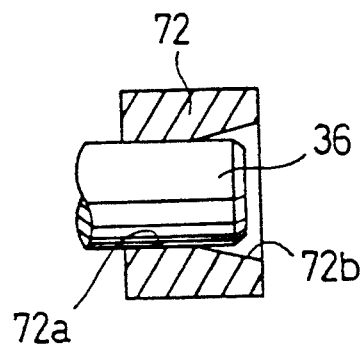
FIG. 2b is an enlarged view illustrating a radial bearing which is enclosed by circle 2b in FIG. 1.

FIG. 2b illustrates the radial bearing 72, which is enclosed in the circle B in FIG. 1. The outer peripheral surface of the proximal end of the rotor shaft is supported by the bearing surface 72a of the radial bearing 72 in the radial direction. The radial bearing 72 includes a tapered surface 72b, which is formed at the distal end, and the inner tapered surface has an outwardly increasing diameter.

Figure 2C:
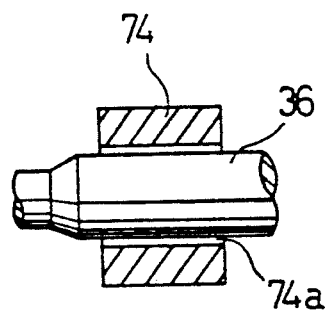
FIG. 2c is an enlarged view illustrating a radial bearing which is enclosed by circle 2c in FIG. 1.

FIG. 2c illustrates a radial bearing 74, which is enclosed in the circle C ( FIG. 1.) The inner diameter of the radial bearing 74 is slightly larger than the outer diameter of the rotor shaft 36. Therefore, a predetermined clearance 74a is formed between the rotor shaft 36 and the radial bearing 74, when the motor is not activated. As a result, the rotor shaft 36 is supported at two points by the radial bearings 70 and 72, respectively. Generally, the clearance 74a ranges between 0.03 mm and 0.5 mm, depending upon the material used to form the rotor shaft 36.

The operation of the bearing device according to the present invention, will now be explained in detail.

When the worm gear is driven by the motor, the counter force is generated by the gear engagement of the thread 52 and the worm wheel 38. The counter force can be divided into two forces. One force is the thrust force, which acts in the axial direction of the rotor shaft 36. The other force is the bending force, which acts in the direction perpendicular to the rotor shaft 36 (in the direction from the worm wheel 38 to the rotor shaft 36). This bending force causes the rotor shaft 36 to bend and to touch the radial bearing 74. As a result, the rotor shaft 36 will contact the radial bearings 70, 72 and 74, at the three points, as illustrated in FIG. 3.

Figure 3:
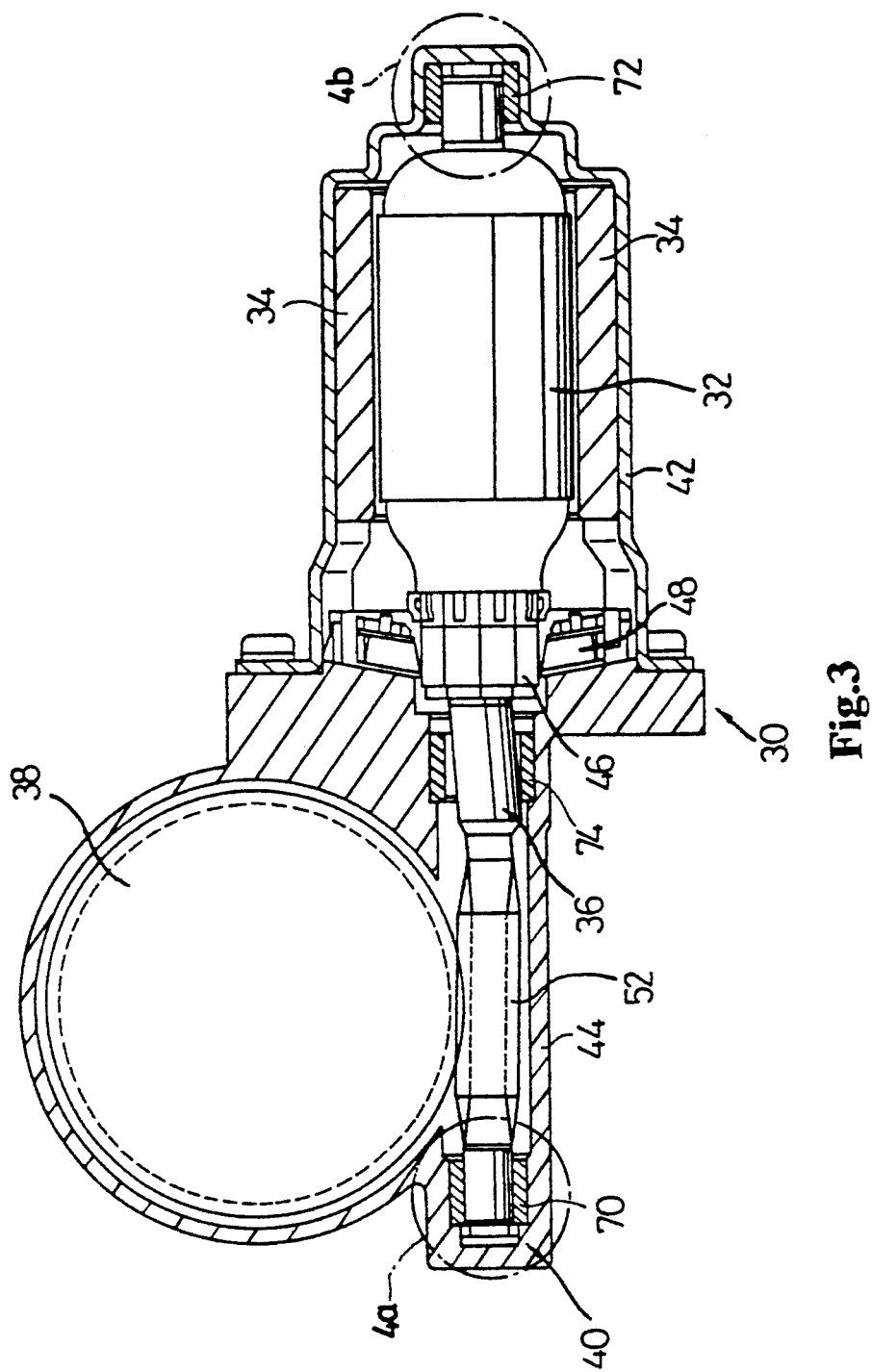
FIG. 3 is another cross-sectional view of the motor in FIG. 1, shown in the activated state.
Figure 4A:
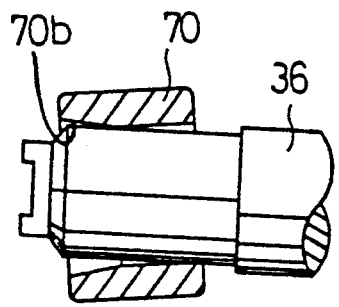
FIG. 4a is an enlarged view of the radial bearing which is enclosed by circle 4a in FIG. 3 when the motor is activated.
Figure 4B:
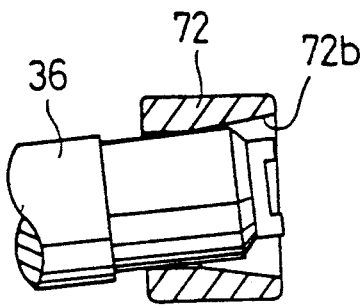
FIG. 4b is an enlarged view of the radial bearing which is enclosed by circle 4b in FIG. 3, when the motor is activated.

FIGS. 4a and 4b are enlarged views of the radial bearings 70 and 72, when the rotor shaft 36 is caused to bend, as illustrated in FIG. 3. FIG. 4a illustrates the engagement relationship of the radial bearing 70 and the rotor shaft 36. When the rotor shaft 36 is caused to bend, the deflection angle is generated at the distal end of the rotor shaft 36. The contact between the distal end of the rotor shaft 36 and the inner peripheral surface of the radial bearing 70 is prevented by the tapered inner peripheral surface 70b of the radial bearing 70, FIG. 2a. FIG. 4b illustrates the engagement relationship of the radial bearing 72 and the proximal end of the rotor shaft 36, which is enclosed in the circle B in FIG. 3. The inner proximal end of the radial bearing 72 has a tapered surface 72b, which is similar to that of the radial bearing 70. Therefore, when the rotor shaft 36 is caused to bend, contact between the proximal end of the rotor shaft 36 and the inner peripheral surface of the radial bearing 72 is prevented.

The bearing device in this embodiment includes the radial bearings 70 and 72 which are disposed at both distal ends of the rotor shaft 36. Furthermore, the radial bearing 74 is disposed at the central or intermediate section of the rotor shaft 36. The radial bearing 70 includes the clearance 74a between the inner peripheral surface of the bearing and the outer peripheral surface of the rotor shaft 36, when the motor is free from load. Therefore, the rotor shaft 36 is supported at two points, at the radial bearings 70 and 72, when the motor is free from load. Even when one of the radial bearings 70 and 72 is slightly off-centered, the rotation of the rotor 36 is not affected. Therefore, noise generation is prevented, and the rotor shaft 36 rotates smoothly. As a result, the steady rotation maintains a stable induced current.

When the motor is activated and the rotor shaft 36 is caused to bend, the rotor shaft 36 abuts against the radial bearing 74. Therefore, the rotor shaft 36 is supported at three points of the radial bearings 70, 72 and 74.

Figure 5:
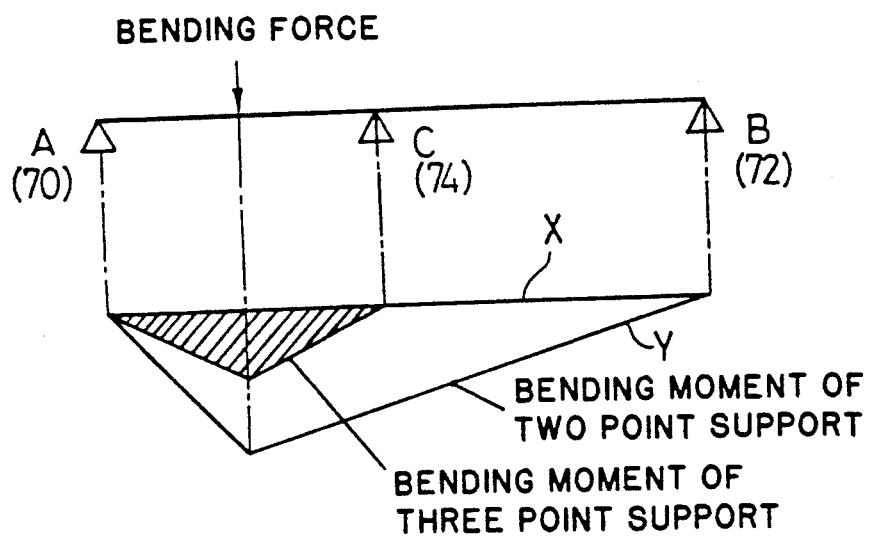
FIG. 5 is a schematic diagram illustrating the bending moment of the rotor shaft, in accordance with a two-point support and a three-point support.
Figure 6:
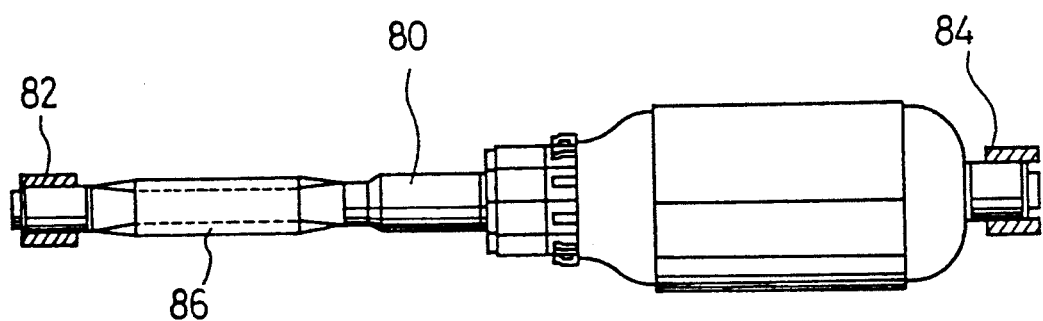
FIG. 6 is a plan view of a conventional bearing device for a motor shaft.
Figure 7:
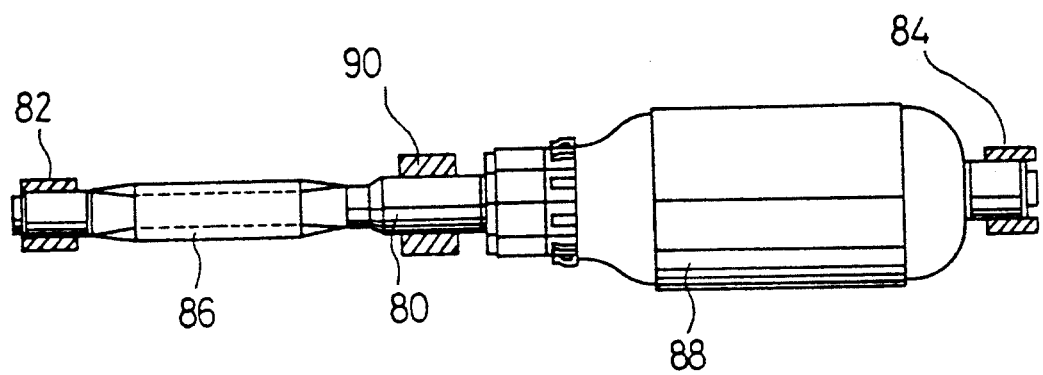
FIG. 7 is a plan view of another conventional bearing device for motor shaft.
Figure 8:
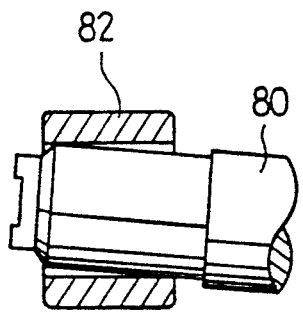
FIG. 8 is an enlarged view of the radial bearing in FIG. 7.

FIG. 5 illustrates the positional relationship of the rotor shaft 36 with respect to each of the radial bearings 70, 72 and 74, and the bending force (the counter force of the worm wheel) of the worm wheel 38. The letters A, B and C represent the corresponding positions of the radial bearings 70, 72 and 74, respectively. The graph designated by X represents the bending moment generated by three point support, including the radial bearing 74. The graph designated by Y represents the bending moment generated by the two point support. FIG. 5 clearly indicates that the bending moment of the three point support is significantly reduced in comparison to the bending moment of the two point support.

In this embodiment, in comparison to the two point support of the rotor shaft 36, every part of the rotor shaft 36 has a lower bending effect, when the motor is activated. As a result, the diameter of the rotor shaft 36 can be reduced, and the diameter of the thread is also reduced. Therefore, it is now possible to make the motor smaller and lighter.

The radial bearings 70 and 72, have tapered surfaces 70a and 72a, respectively. Each of these tapered surfaces 70a and 72a has an outwardly radially increasing diameter. Therefore, when the rotor shaft 36 is caused to bend, the distal ends of the rotor shaft 36 do not touch the inner peripheral surface of the radial bearings 70 and 72, respectively. As a result, noise generation is prevented. The distal ends do not continuously abut against the inner peripheral surface of the radial bearings, so that the motor can smoothly start.

Therefore, the foregoing motor can be used in many applications where space is limited, i.e. inside a vehicle, where a quiet environment is desirable. Even if the motor were used as the reclining motor which is usually intermittently activated, the probability of the malfunction of the motor is significantly reduced, and the quality of the finished goods is increased.

Although only one embodiment of the present invention has been described herein, it should be apparent to those skilled in the art that the present invention may be embodied in many other specific forms without departing from the spirit or scope of the invention. Particularly, it should be understood that following modes are to be applied.

In this embodiment, the tapered surfaces which are formed at the inner peripheral surfaces of the radial bearings have straight cross-sectional edges. The cross-sectional edges could alternatively be curved.

In this embodiment, the motor including the bearing device is used with a reclining power seat. This motor can also be used for the seat slide, the seat lift and the power window.

Therefore, the present examples and embodiments are to be considered as illustrative and not restrictive and the invention is not to be limited to the details giving herein, but may be modified within the scope of the appended claims.

What is claimed is:

1. A bearing device for supporting a rotor shaft of a motor, comprising:
    a first radial bearing for supporting a second end of the rotor shaft;
    a second radial bearing for supporting a second end of the rotor shaft;
    compensating means for supporting an intermediate section of the rotor shaft, when said intermediate section is caused to bend, said intermediate section being located between said first and second ends of the rotor shaft; and
    wherein said compensating means includes a radial bearing having an inner peripheral surface which is spaced away from the rotor shaft, when the rotor shaft is free from load.

2. The bearing device according to claim 1, wherein said first and second bearings include peripheral tapered surfaces, and wherein each of said tapered surfaces has an outwardly radially increasing diameter for avoiding interference with the corresponding end of the rotor shaft.

3. A bearing device for supporting a rotor shaft of a motor having a worm-like thread meshing with a corresponding worm-wheel, the bearing device comprising:
    a first radial bearing for supporting a first end of the rotor shaft;
    a second radial bearing for supporting a second end of the rotor shaft;
    compensating means for supporting an intermediate section of the rotor shaft, said intermediate section being located between said first and second ends, wherein the thread and the rotor shaft are caused to bend by the effect of a load from the wormwheel, said first and second bearings include peripheral tapered surfaces, and wherein each of said tapered surfaces has an outwardly radially increasing diameter for avoiding interference with the corresponding end of the rotor shaft.

4. A bearing device for supporting a rotor shaft of a motor comprising:
    a first radial bearing for supporting a first end of the rotor shaft;

a second radial bearing for supporting a second end of the rotor shaft;

compensating means for supporting an intermediate section of the rotor shaft, when said intermediate section is caused to bend, said intermediate section being located between said first and second ends of the rotor shaft; and wherein said first and second bearings include peripheral tapered surface, and wherein each of said tapered surfaces has an outwardly radially increasing diameter for avoiding interference with the corresponding end of the rotor shaft.

5. A bearing device for supporting a rotor shaft of a motor having a worm-like thread meshing with a corresponding worm-wheel, the bearing device comprising:

a first radial bearing for supporting a first end of the rotor shaft;

a second radial bearing for supporting a second end of the rotor shaft;

compensating means for supporting an intermediate section of the rotor shaft, said intermediate section being located between said first and second ends, wherein the thread and the rotor shaft are caused to bend by the effect of a load from the worm-wheel; and wherein said compensating means includes a radial bearing having an inner peripheral surface which is spaced away from the rotor shaft, when the rotor shaft is free from load.

6. A bearing device for supporting a rotor shaft of a motor having a worm-like thread meshing with a corresponding worm-wheel, the bearing device comprising:

a first radial bearing for supporting a first end of the rotor shaft;

a second radial bearing for supporting a second end of the rotor shaft;

compensating means for supporting an intermediate section of the rotor shaft, said intermediate section being located between said first and second ends, wherein the thread and the rotor shaft are caused to bend by the effect of a load from the worm-wheel; and wherein said first and second bearings include peripheral tapered surfaces, and wherein each of said tapered surfaces has an outwardly radially increasing diameter for avoiding interference with the corresponding end of the rotor shaft.

* * * * *